US012606055B2

(12) United States Patent
Melchior

(10) Patent No.: US 12,606,055 B2
(45) Date of Patent: Apr. 21, 2026

(54) METHOD AND APPARATUS FOR MAINTAINING CONTACT BETWEEN A SLIDABLE CURRENT COLLECTOR AND A CONDUCTOR RAIL

(71) Applicant: Caterpillar Inc., Peoria, IL (US)

(72) Inventor: Luke T. Melchior, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 757 days.

(21) Appl. No.: 17/985,673

(22) Filed: Nov. 11, 2022

(65) Prior Publication Data

US 2024/0157852 A1     May 16, 2024

(51) Int. Cl.
B60M 1/02 (2006.01)
B60M 1/30 (2006.01)
G06T 7/00 (2017.01)

(52) U.S. Cl.
CPC ............... B60M 1/02 (2013.01); B60M 1/30 (2013.01); B60M 1/305 (2013.01); G06T 7/00 (2013.01); B60L 2200/40 (2013.01)

(58) Field of Classification Search
CPC ...... B60L 5/00; B60L 5/08; B60L 5/12; B60L 5/16; B60L 5/19; B60L 5/22; B60L 5/24; B60L 5/28; B60L 5/29; B60L 5/40; B60L 5/38; B60L 50/53; B60L 2200/40; B60L 2200/36; G06T 7/00; G06T 7/70; G06T 7/73; G06T 7/75; G06T 7/20; G06T 7/246; G06T 7/251; B60M 1/00; B60M 1/02; B60M 1/30; B60M 1/305
USPC ............... 191/22, 29 R, 45 R, 49, 50, 53, 66
See application file for complete search history.

(56) References Cited

U.S. PATENT DOCUMENTS

| | | | |
|---|---|---|---|
| 9,022,153 B2 | 5/2015 | Tojima et al. | |
| 11,468,685 B2 * | 10/2022 | Kato | H04N 7/18 |
| 2013/0018766 A1 | 1/2013 | Christman | |
| 2014/0224609 A1 | 8/2014 | Saito et al. | |
| 2017/0001524 A1 * | 1/2017 | Vahle | B66C 13/12 |

(Continued)

FOREIGN PATENT DOCUMENTS

| | | |
|---|---|---|
| CN | 207859963 U | 9/2018 |
| JP | 2014143838 A | 8/2014 |
| JP | 6193140 B2 | 9/2017 |

(Continued)

OTHER PUBLICATIONS

Written Opinion and International Search Report for Int'l. Patent Appln. No. PCT/US2023/077360, mailed Feb. 13, 2024 (9 pgs).

*Primary Examiner* — S. Joseph Morano
*Assistant Examiner* — Heaven R Buffington
(74) *Attorney, Agent, or Firm* — Shruti Law PLLC

(57) ABSTRACT

An alignment assist assembly for a work machine includes a camera supported to a lateral side of the work machine and at an elevation above at least one power rail, the camera being oriented toward the haul route and configured to capture an image field and generate an image signal indicative of the image field. A display is operably connected to the camera and disposed in the cab, the display configured to generate a displayed image based on the image signal from the camera. The display further is configured to display an alignment overlay indicative of a range of distances between the frame and the at least one power rail that permit the current collector to engage the surface of the at least one power rail.

20 Claims, 9 Drawing Sheets

(56)     References Cited

U.S. PATENT DOCUMENTS

| 2018/0245316 A1 | 8/2018 | Forcash et al. |
| 2021/0238827 A1 | 8/2021 | Ries et al. |

FOREIGN PATENT DOCUMENTS

| JP | 2018042399 A | 3/2018 |
| JP | 2021166437 A | 10/2021 |
| WO | 2020102297 A1 | 5/2020 |

* cited by examiner

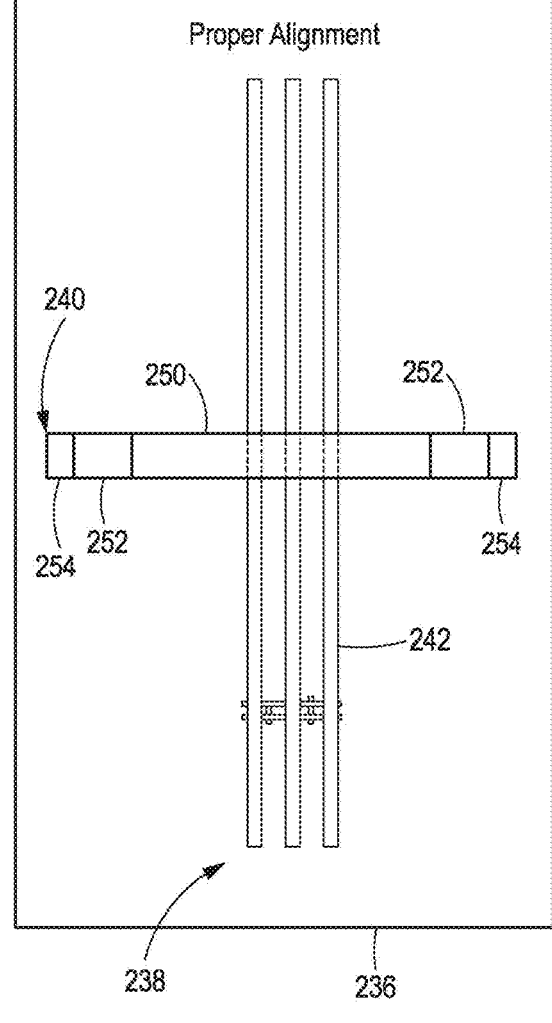
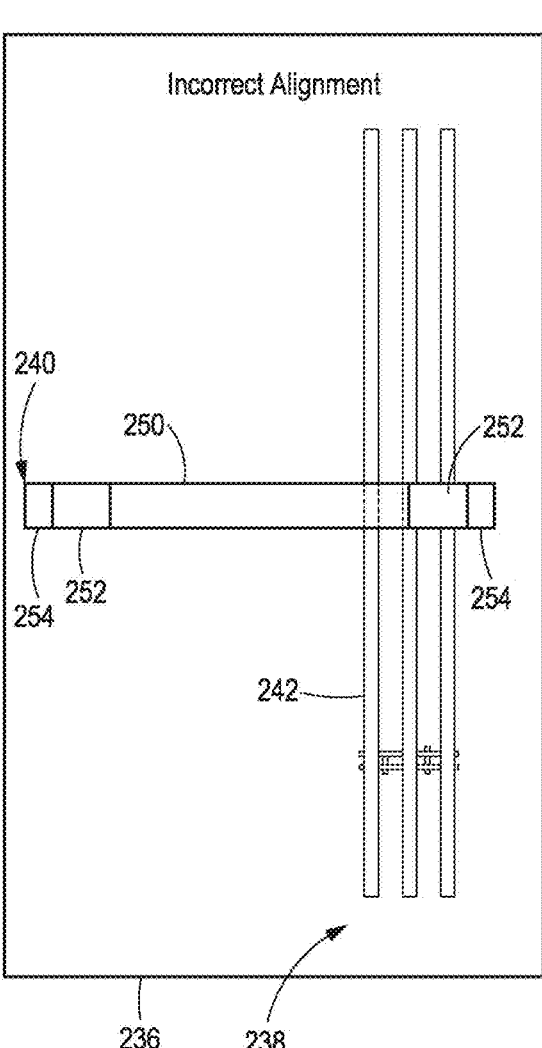
FIG. 7          FIG. 8

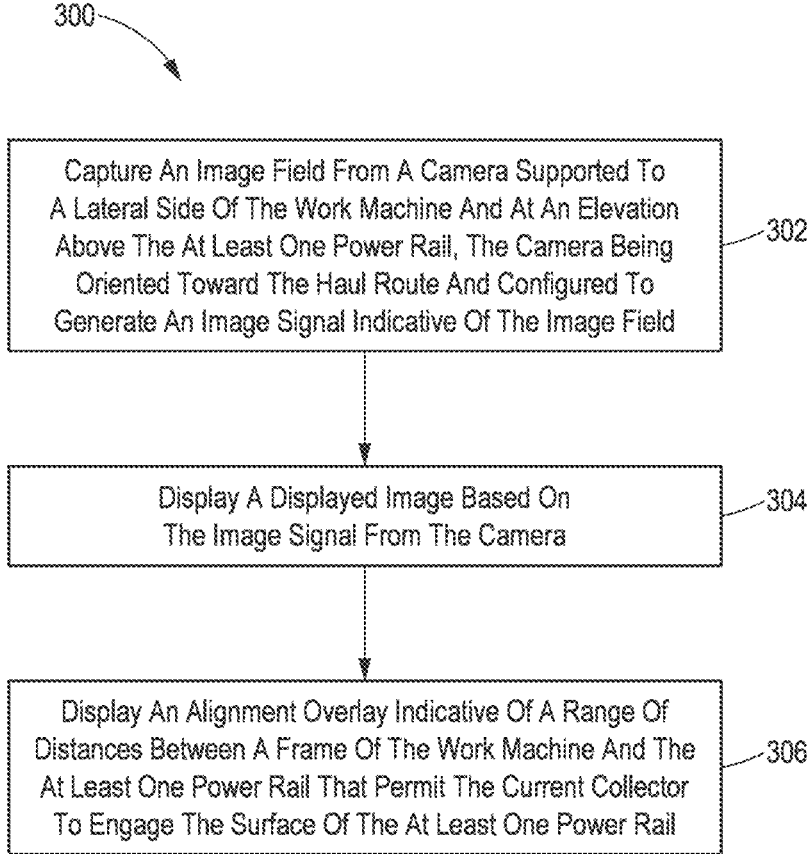

300

302 — Capture An Image Field From A Camera Supported To A Lateral Side Of The Work Machine And At An Elevation Above The At Least One Power Rail, The Camera Being Oriented Toward The Haul Route And Configured To Generate An Image Signal Indicative Of The Image Field 304 — Display A Displayed Image Based On The Image Signal From The Camera 306 — Display An Alignment Overlay Indicative Of A Range Of Distances Between A Frame Of The Work Machine And The At Least One Power Rail That Permit The Current Collector To Engage The Surface Of The At Least One Power Rail

FIG. 11

METHOD AND APPARATUS FOR MAINTAINING CONTACT BETWEEN A SLIDABLE CURRENT COLLECTOR AND A CONDUCTOR RAIL

TECHNICAL FIELD

The present disclosure generally relates to slidable current collectors that contact conductor rails, and more particularly to methods and apparatus that establish and maintain alignment of a slidable current collector with the conductor rails.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but the use of machines powered by diesel engines may not be appropriate in certain environments. For instance, in some implementations, heavy work machines may need to travel large distances through rugged terrain. At a remote mining site, for example, groups of these machines are often employed to ferry extreme loads along roadways, or haul routes, extending between various locations within the mining site. In addition, the groups of diesel machines can generate significant pollution.

A power rail based on the ground may provide electrical power to traveling vehicles such as heavy work machines. In some environments, such as with trains or subways that travel on a fixed track, precise alignment between the fixed track and the power rail can ensure reliable delivery of electrical power to a current collector as the vehicle moves. For a heavy work machine that is freely steerable, however, establishing and maintaining an electrical connection between a current collector attached to an extended arm and the power rail can be particularly challenging. The rails may be slightly uneven, twisted, or curved, possibly leading to disconnections or arcing. Arcing can degrade current flow and damage components.

In some environments, such as a mining site, the terrain can also interfere with continuous connection with power rails for a freely steerable work machine along a haul route. The haul route may be uneven, hilly, and pocked, which can lead to steering deviations. These variations in terrain can cause the machine to disconnect from the rail, detracting from the value of rail-based delivery of electrical power. While increasing adhesion between the current collector and the rail may decrease disconnections, increased adhesion at the current collector leads to unwanted drag on the arm of the work machine and accelerates wear on the current collector.

One approach for contacting a current collector and a power rail is described in U.S. Pat. No. 3,804,997 ("the '997 patent"). The '997 patent describes a system for a train traveling at high speeds that purports to counteract the fluttering of contact shoes sliding against a powered rail, which can interrupt electrical contact. A contactless force field, which may be magnetic or pneumatic, provides offsetting forces to stabilize the collector shoe against the power rail with fixed spacing during high-speed travel. The system of the '997 patent, however, addresses only fluttering of collector shoes with a vehicle traveling in fixed relation to a powered rail and does not contemplate positional deviations in multiple dimensions between a freely steerable vehicle and the powered rail. As a result, the system of the '997 patent is insufficient for freely steerable vehicles having current collectors sliding over a power rail along a haul route that may vary over diverse terrain.

Examples of the present disclosure are directed to overcoming deficiencies of such systems.

SUMMARY OF THE DISCLOSURE

In one aspect of the present disclosure, an alignment assist assembly is provided for a work machine. The work machine includes a frame, a cab coupled to the frame, an electric motor coupled to the frame, traction devices coupled to the frame and operably coupled to the electric motor to cause movement of the work machine disposed proximate a haul route when powered by the electric motor, a boom coupled to and extending laterally from the frame, a trailing arm assembly pivotably coupled to the boom, and a current collector coupled to the trailing arm assembly and configured to move across a surface of at least one power rail along the haul route and conduct electrical energy to the electric motor. The alignment assist assembly includes a camera supported to a lateral side of the work machine and at an elevation above the at least one power rail, the camera being oriented toward the haul route and configured to capture an image field and generate an image signal indicative of the image field. A display is operably connected to the camera and disposed in the cab, the display configured to generate a displayed image based on the image signal from the camera. The display further is configured to display an alignment overlay indicative of a range of distances between the frame and the at least one power rail that permit the current collector to engage the surface of the at least one power rail.

In another aspect of the disclosure, a work machine includes a frame, a cab coupled to the frame, an electric motor coupled to the frame, and traction devices coupled to the frame and operably coupled to the electric motor to cause movement of the work machine disposed proximate a haul route when powered by the electric motor. A boom is coupled to and extends laterally from the frame, the boom having a boom proximal end and a boom distal end. A trailing arm assembly has a trailing arm assembly proximal end pivotably coupled to the boom distal end, and a trailing arm assembly distal end, and a current collector is coupled to the trailing arm assembly distal end and configured to move across a surface of at least one power rail along the haul route and conduct electrical energy to the electric motor. The work machine further includes an alignment assist assembly comprising a camera supported to a lateral side of the work machine and at an elevation above the at least one power rail, the camera being oriented toward the haul route and configured to capture an image field and generate an image signal indicative of the image field, and a display operably connected to the camera and disposed in the cab, the display configured to generate a displayed image based on the image signal from the camera. The display further is configured to display an alignment overlay indicative of a range of distances between the frame and the at least one power rail that permit the current collector to engage the surface of the at least one power rail.

In yet another aspect of the disclosure, a method is provided of aligning a work machine, traveling along a haul route, with at least one power rail so that a current collector of the work machine is in contact with a surface of at least one power rail. The method includes capturing an image field from a camera supported to a lateral side of the work machine and at an elevation above the at least one power rail, the camera being oriented toward the haul route and configured to generate an image signal indicative of the image field. The method further includes displaying, on a display operably connected to the camera and disposed in a cab of the work machine, a displayed image based on the image signal from the camera. Additionally, the method includes displaying, on the display, an alignment overlay indicative of a range of distances between a frame of the work machine and the at least one power rail that permit the current collector to engage the surface of the at least one power rail.

BRIEF DESCRIPTION OF THE DRAWINGS

FIG. 7 is a graphical display of the alignment assist assembly of FIG. 6, in accordance with an example of the present disclosure.

FIG. 8 is a further graphical display of the alignment assist assembly of FIG. 6, in accordance with an example of the present disclosure.

FIG. 10 is a flowchart of a method of aligning a work machine with a power rail, in accordance with an example of the present disclosure.

FIG. 11 is a flowchart of a method of aligning a work machine with a power rail, in accordance with an example of the present disclosure.

DETAILED DESCRIPTION

Figure 1:
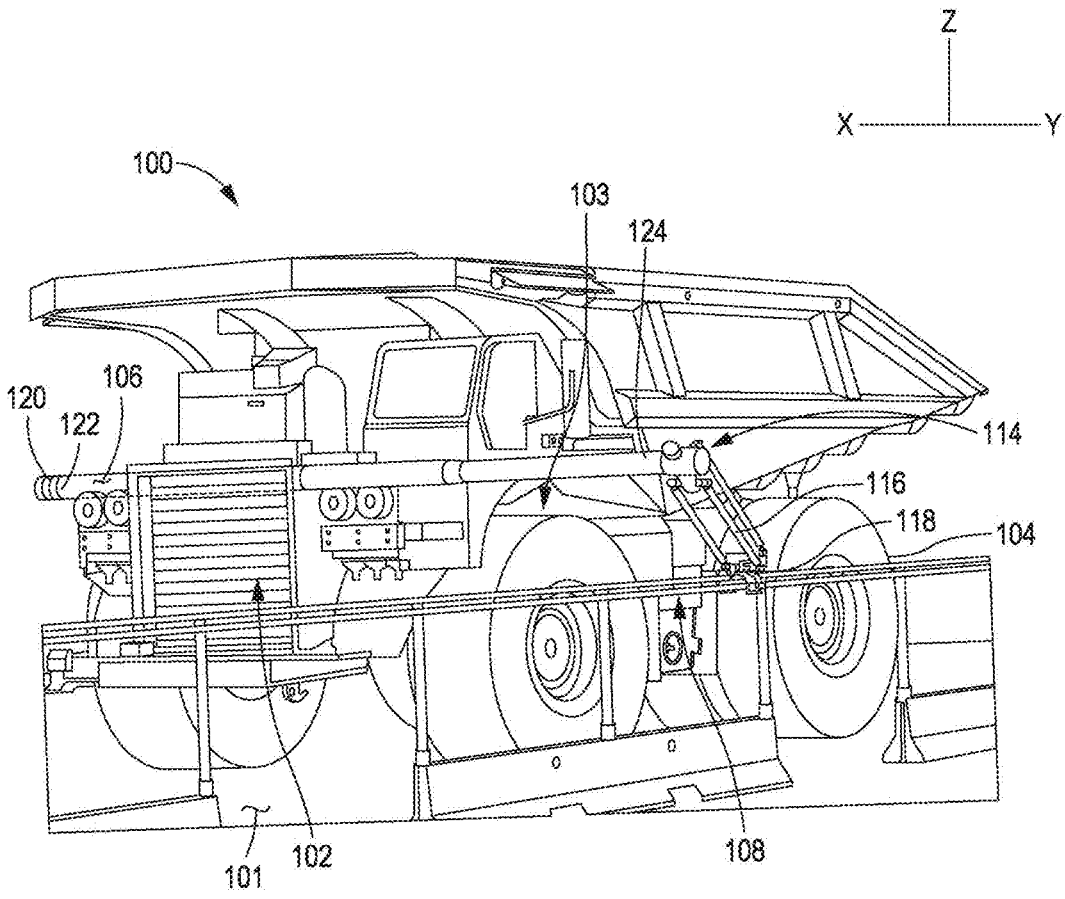
FIG. 1 is a front isometric view of an electrically powered work machine coupled to a roadside power source in accordance with an example of the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels along a defined path or roadway, also termed haul route 101, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include an articulated truck, an off-highway truck, an on-highway truck, a dump truck, a wheel tractor scraper, a loader, an excavator, a pipe layer, a motor grader, or any other similar machine. In other implementations, work machine 100 need not haul a load and may be any movable machine associated with various industrial applications including, but not limited to, mining, agriculture, forestry, construction, and other industrial applications.

Referring to FIG. 1, an example work machine 100 includes a frame 103 powered by electric motor 102 to cause rotation of traction devices 104. Traction devices 104 are typically four or more wheels with tires, although tracks or other mechanisms for engagement with the ground along haul route 101 are possible. Electric motor 102 functions to provide mechanical energy to work machine 100 based on an external electrical power source, such as described in further detail below. A primary example of mechanical energy provided by electric motor 102 is propelling traction devices 104 to cause movement of work machine 100 along haul route 101, but electric motor 102 also includes components sufficient to power other affiliated operations within work machine 100. For instance, in some implementations, electric motor 102 includes equipment for converting electrical energy to provide pneumatic or hydraulic actions within work machine 100. While electric motor 102 is configured to operate from an external electrical power source, electric motor 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 includes one or more beams of metal arranged substantially parallel to and at a distance above the ground. Support mechanisms hold power rail 108 in place along a distance at the side of a haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 (along the Y axis) as work machine 100 travels in the direction of the X axis, power rail 108 may be installed to the right of work machine 100 (along the −Y axis) or in other locations suitable to the particular implementation. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101.

Power rail 108 provides a source of electrical power for work machine 100 as either AC or DC voltage. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides a reference voltage of 0 volts, with the two powered conductors providing +1500 VDC and −1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a rigid pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a proximal end near a right side of work machine 100 and a distal end at a left side of work machine 100. Conductor rod 106 may be attached to any convenient location within work machine 100, such as to frame 103, in a manner to enable conductor rod 106 to reach and couple to power rail 108. Shown in FIG. 1 as extending to a left side of work machine 100 toward power rail 108, conductor rod 106 may alternatively be arranged to extend to a right side (along the −Y axis) and at any desired angle from work machine 100 such that conductor rod 106 may be coupled to power rail 108 for obtaining electrical power.

Within, and possibly including cylinder portion 109, conductor rod 106 has a series of electrical conductors passing longitudinally, i.e. along the Y axis in FIG. 1, at least from a base 122 at a proximal end to a tip 124 at a distal end. Typically, the conductors within conductor rod 106 are formed of a metallic material.

At tip 124 of conductor rod 106, a connector assembly 114 provides an interface to power rail 108 via trailing arms 116 and current collector 118. The arrangement of connector assembly 114, trailing arms 116, and current collector 118 of FIG. 1 are collectively also referred to as a trailing assembly. Power rail 108 is typically arranged along a side of haul route 101, and work machine 100 traverses haul route 101 substantially in parallel with power rail 108. Thus, in reference to FIG. 1, power rails 108 and a travel path for work machine 100 are substantially in parallel with each other and with the X axis. Current collector 118 is configured to maintain an electrical connection with power rail 108 while sliding along its surface in the direction of the X axis as work machine 100 moves. In some examples, trailing arms 116 are conductors coupled to current collector 118, each conducting voltage and current at a different electrical pole for respective conductors within conductor rod 106. In operation, electrical power is accessed from power rail 108 via current collector 118, which remains in contact during movement of work machine 100, and the electrical power is conducted through trailing arms 116 into connector assembly 114.

From connector assembly 114, the electrical power is conveyed at tip 124 to base 122 of conductor rod 106 and through an interface 120 to work machine 100. Interface 120 provides at least an electrical connection between conductor rod 106 and work machine 100 for powering electric motor 102 and otherwise enabling operations within work machine 100. In some examples, interface 120 may also provide an interface for controls between work machine 100 and conductor rod 106. In some examples, interface 120 includes passageways to control operations within current collector 118 and/or for signals to communicate with electronic controls.

Connector assembly 114 not only provides electrical connection between the conductors within extension 110 of conductor rod 106 and trailing arms 116, but also accommodates changes in relative position between power rail 108 and work machine 100 during travel along haul route 101.

Those changes in relative position can include multiple deviations, such as those occurring vertically (work machine 100 and connector assembly 114 moving in the Z axis relative to current collector 118), and angularly (work machine 100 and connector assembly 114 moving in the X-Y plane angularly around the Z axis). Each of these deviations could occur as a driver steers work machine 100 along haul route 101, work machine 100 responds to an uneven or pocked roadway, or an orientation of power rail 108 varies with respect to work machine 100.

Figure 2:
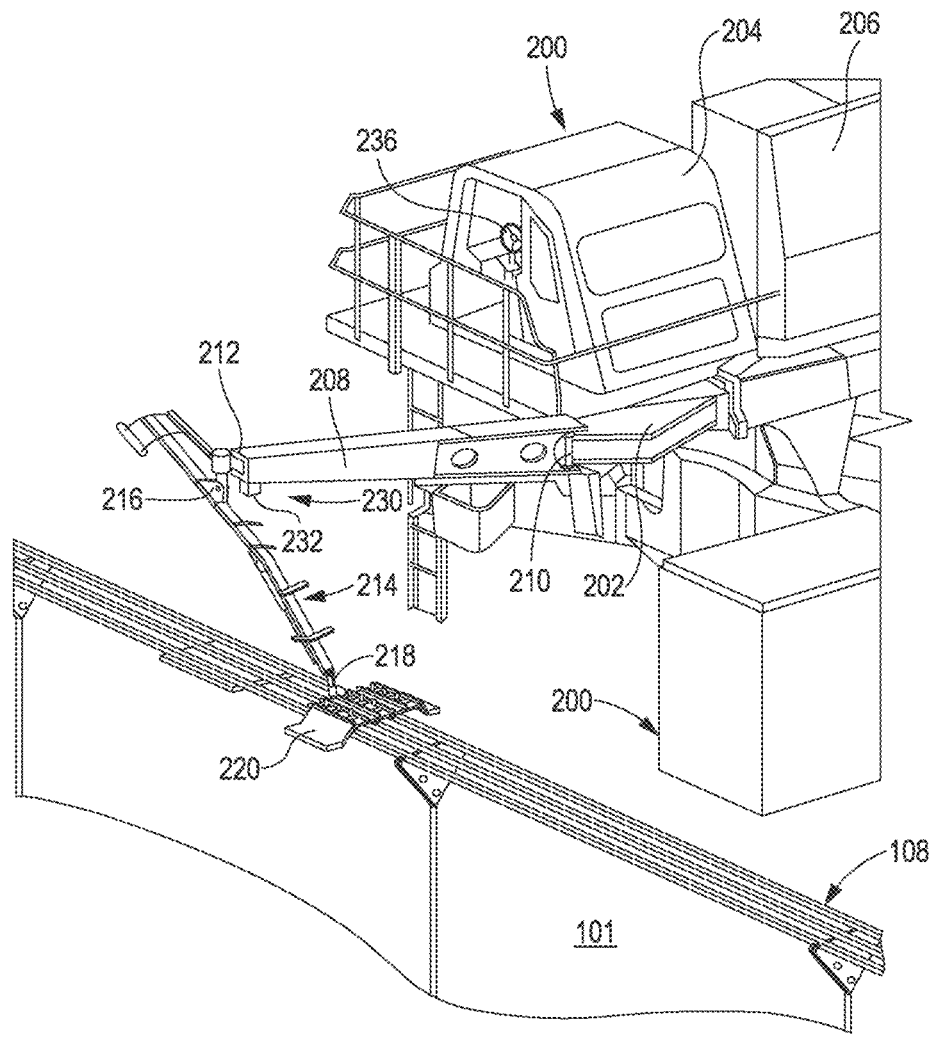
FIG. 2 is a rear, top isometric view of an electrically powered work machine coupled to a roadside power source, in accordance with an example of the present disclosure.
Figure 3:
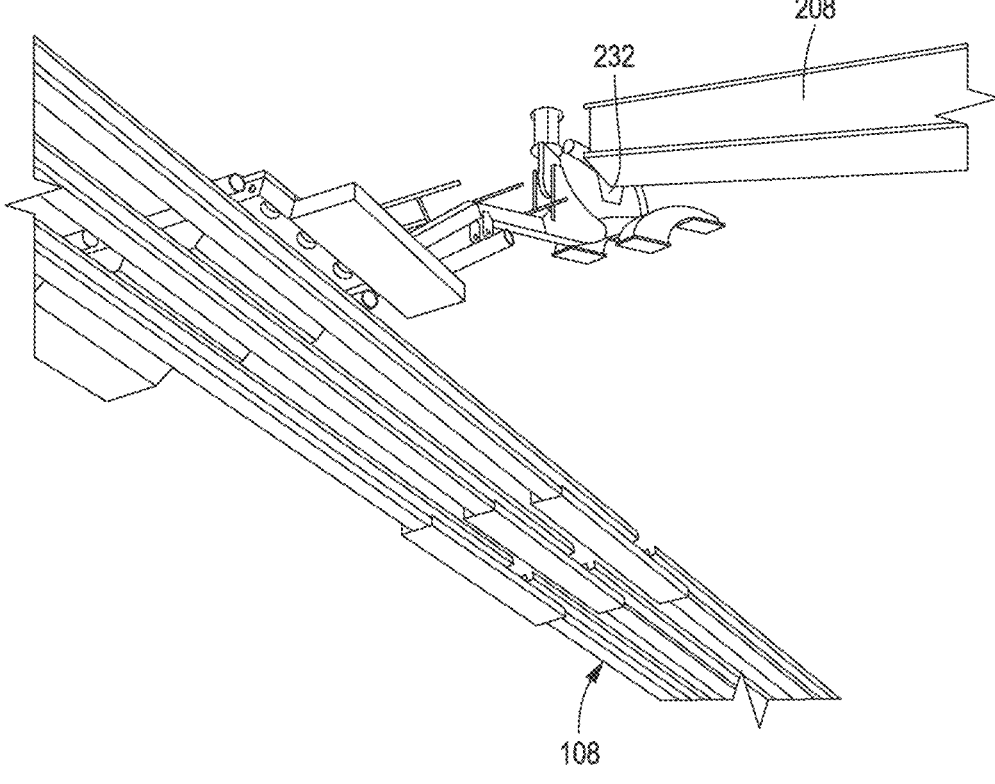
FIG. 3 is a rear, bottom isometric view of the work machine of FIG. 2, in accordance with an example of the present disclosure.
Figure 4:
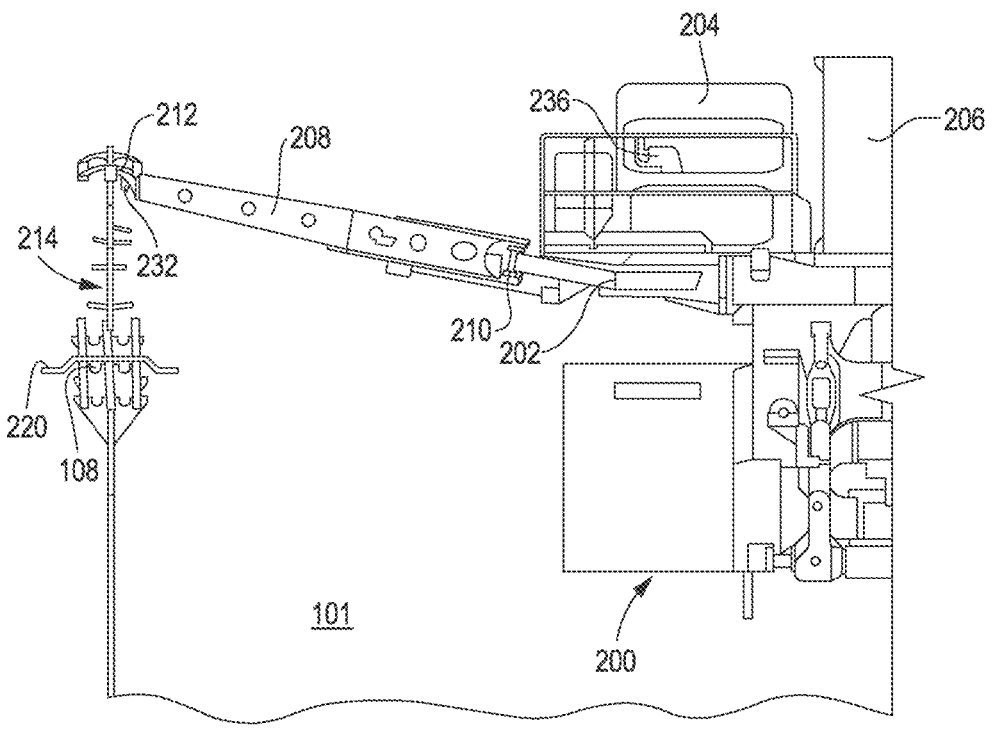
FIG. 4 is a rear elevation view of the work machine of FIG. 2, in accordance with an example of the present disclosure.

FIGS. 2-4 illustrate an additional example of a work machine 200 traveling along haul route 101. The work machine 200 includes a frame 202, a cab 204 coupled to the frame 202, and an electric motor 206 coupled to the frame 202. Traction devices (not shown in FIG. 2) are coupled to the frame 202 and operably coupled to the electric motor 206 to cause movement of the work machine 200, which is disposed proximate haul route 101, when powered by the electric motor 206. Boom 208 extends laterally from the frame 202 and includes a boom proximal end 210 pivotably coupled to the frame and a boom distal end 212. A trailing arm assembly 214 has a trailing arm assembly proximal end 216 pivotably coupled to the boom distal end 212, and a trailing arm assembly distal end 218. A current collector 220 is coupled to the trailing arm assembly distal end 218 and configured to move across a surface of the power rail 108, thereby to conduct electricity to the electric motor 206.

Figure 5:
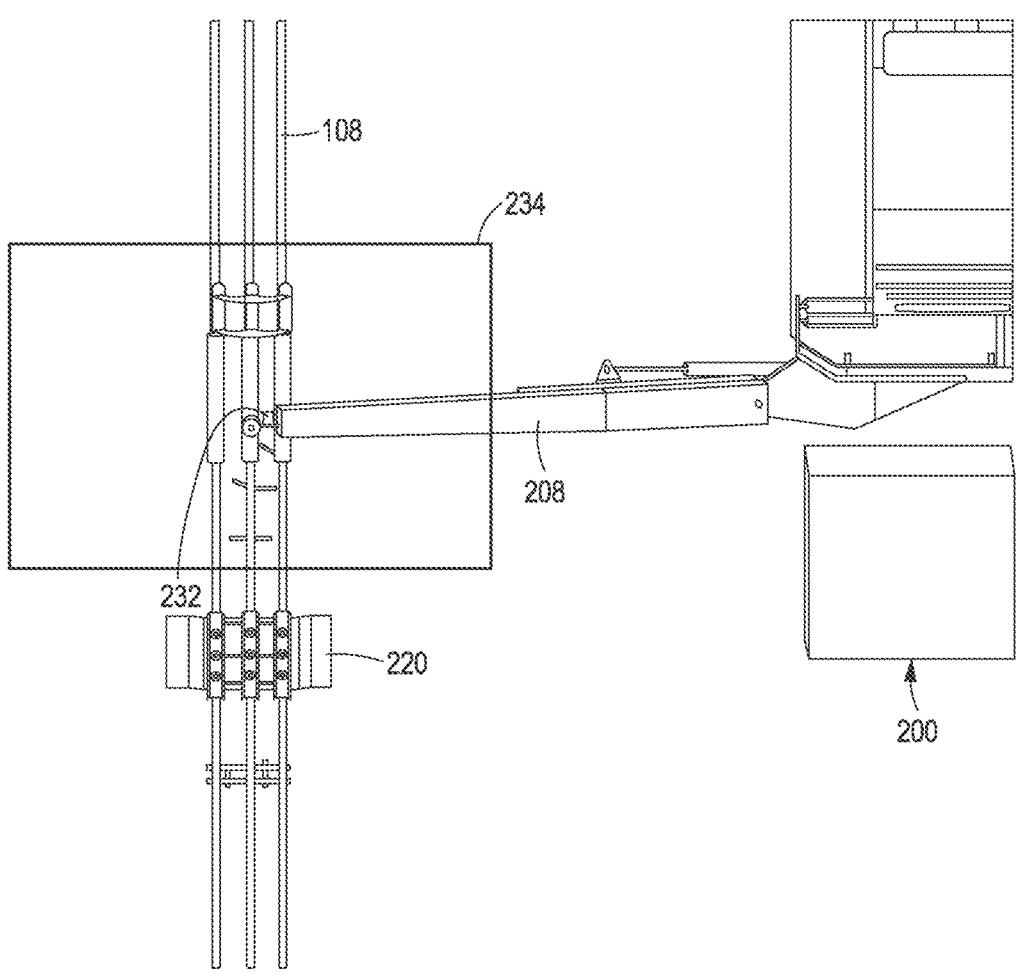
FIG. 5 is a plan view of the work machine of FIG. 2, in accordance with an example of the present disclosure.
Figure 6:
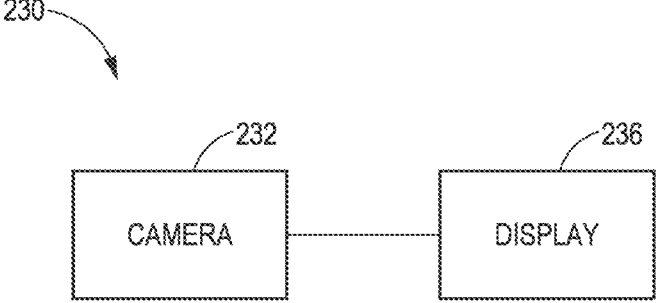
FIG. 6 is a schematic block diagram of an alignment assist assembly provided on the work machine of FIG. 2, in accordance with an example of the present disclosure.

The work machine 200 of FIGS. 2-4 further includes an alignment assist assembly 230 to help an operator positioned in the cab 204 to steer the work machine 200 in a manner that maintains contact between the current collector 220 and the power rail 108. As best shown in FIGS. 2-6, the alignment assist assembly 230 includes a camera 232 supported to a lateral side of the work machine 200 and at an elevation above the power rail 108, so that the camera 232 may be oriented toward the haul route 101 to capture an image field 234, as best shown in FIG. 5. FIGS. 2-5, for example, show the camera 232 coupled to the boom distal end 212, however the camera may be supported from other structure of the work machine 200. The image field 234 is generally a plan view perspective taken from the boom distal end 212. The camera 232 is configured to generate an image signal indicative of the image field 234. The alignment assist assembly 230 also includes a display 236 that is operably connected to the camera 232 and disposed in the cab 204. The display 236 is configured to generate a displayed image 238 (FIGS. 7 & 8) based on the image signal from the camera 232. Additionally, the display 236 is configured to display an alignment overlay 240 indicative of a range of distances between the frame 202 and the power rail 108 that permit the current collector 220 to engage the surface of the power rail 108. For example, the alignment overlay 240 may have a width as shown in FIGS. 7 and 8 that corresponds to a range of approximately three feet, which approximates the amount of lateral movement between the frame 202 and the power rail 108 that can be accommodated by the boom 208 and the trailing arm assembly 214 while still maintaining contact between the current collector 220 and the power rail 108.

The alignment assist assembly 230 advantageously allows an operator to course correct a direction of travel of the work machine 200 to maintain contact between the current collector 220 and the power rail 108. More specifically, when the current collector 220 is in contact with the surface of the power rail 108, the image field 234 captured by the camera 232 will include an image of the power rail 108. Accordingly, the displayed image 238 will include a graphic representation 242 of the power rail 108 positioned relative to the alignment overlay 240. The graphic representation 242 of the power rail 108 will serve as an effective "needle" indicating positioning of the boom distal end 212 relative thereto, thereby providing an intuitive indication of alignment. More specifically, when the graphic representation 242 of the power rail 108 is shown extending through the middle of the alignment overlay 240, it will indicate that the frame 202 of the work machine 200 is properly spaced relative to the power rail 108 to maintain contact between the current collector 220 and the power rail 108, as shown in FIG. 7. Conversely, should the graphic representation 242 of the power rail 108 be shown on the display 236 as extending through an edge of the alignment overlay 240, then it will indicate that the frame 202 of the work machine is improperly spaced relative to the power rail 108 and that the operator must steer the work machine 200 to avoid disconnecting the current collector 220 from the power rail 108. Furthermore, by using the graphic representation 242 as the "needle," the steering direction needed to achieve proper alignment is intuitive. For example, when the graphic representation 242 of the power rail 108 extends through a right edge of the alignment overlay 240, as shown in FIG. 8, then it is instinctive that the work machine 200 is to be steered to the left to better align the current collector 220 with the power rail 108. In the illustrated embodiment, the graphic representation 242 of the power rail 108 extends vertically across the display 236, and the alignment overlay 240 extends horizontally across the display 236.

In some examples, the alignment overlay 240 may include multiple zones or regions for identifying the degree of alignment. As shown in FIGS. 7 and 8, for example, the alignment overlay 240 includes a first region 250 at a central portion of the alignment overlay 240, and a second region 252 at portions of the alignment overlay 240 immediately outward of each side of the central portion. Additionally, the alignment overlay 240 may include a third region 254 at portions of the alignment overlay 240 immediately outward of each side of the second region 252. Each region may have a unique appearance on the display 236 to help the operator quickly identify the degree of alignment. For example, the first region 250 may have a first graphic indicia such as a first color, the second region 252 may have a second graphic indicia such as a second color different from the first color, and the third region 254 may have a third graphic indicia such as a third color that is different than the first and second colors. Instead of different colors, the graphic indicia may be different patterns, levels of opacity, labels, or other visual effects that distinguish the regions from each other.

Figure 9:
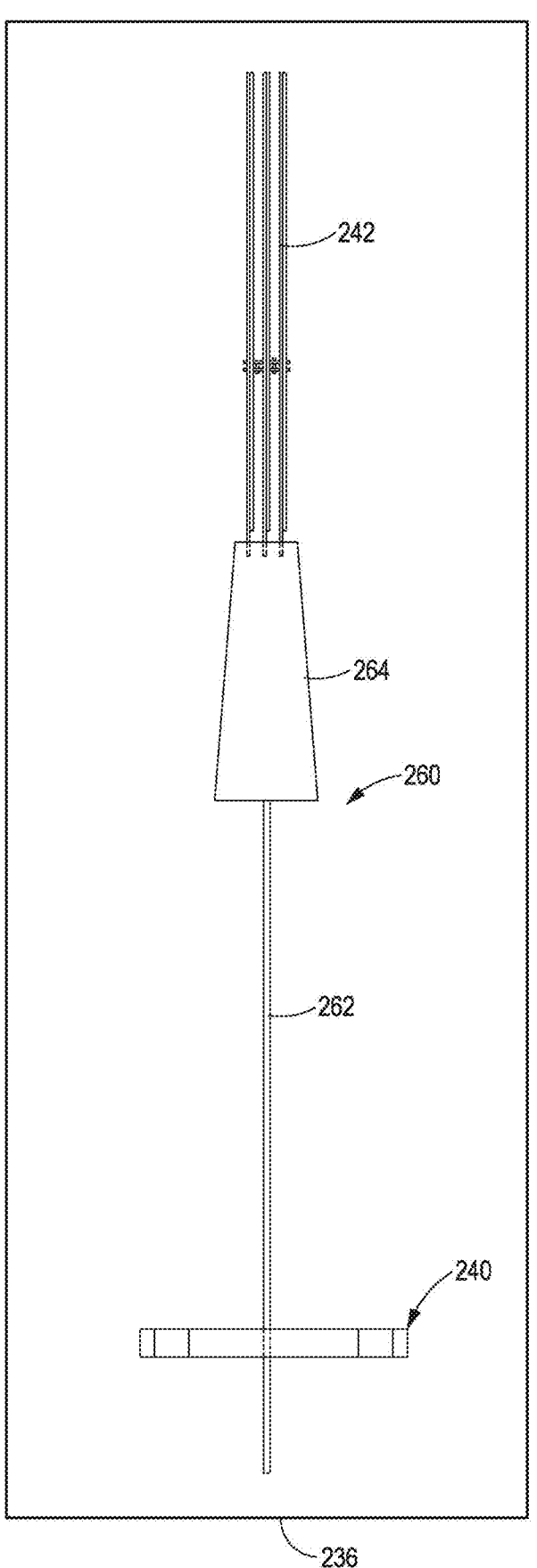
FIG. 9 is yet another graphical display of the alignment assist assembly of FIG. 6, in accordance with an example of the present disclosure.

In addition to assisting with alignment when the current collector 220 is already in contact with the power rail 108, the alignment assist assembly 230 may also help with positioning of the work machine as it approaches the power rail 108. FIG. 9 depicts the display 236 showing a displayed image 260 that includes a graphic representation 262 of an entry rail that is aligned with the power rail 108. The entry rail may be a rail made of steel or other material that is detectable by the camera 232. The displayed image 260 also includes a graphic representation 264 of a transition ramp used to guide the current collector 220 to the elevation of the power rail 108, and the graphic representation 242 of the power rail 108. The displayed image 260 further includes the alignment overlay 240 positioned relative to the graphic representations 262, 264, 242 based on a position of the camera 232. The graphic representation 262 of the entry rail positioned relative to the alignment overlay 240 allows the operator to steer the work machine 200 so that the current collector 220 is aligned with the transition ramp and the power rail 108, thereby to more reliably initiate contact between the current collector 220 and the power rail 108.

Figure 10:
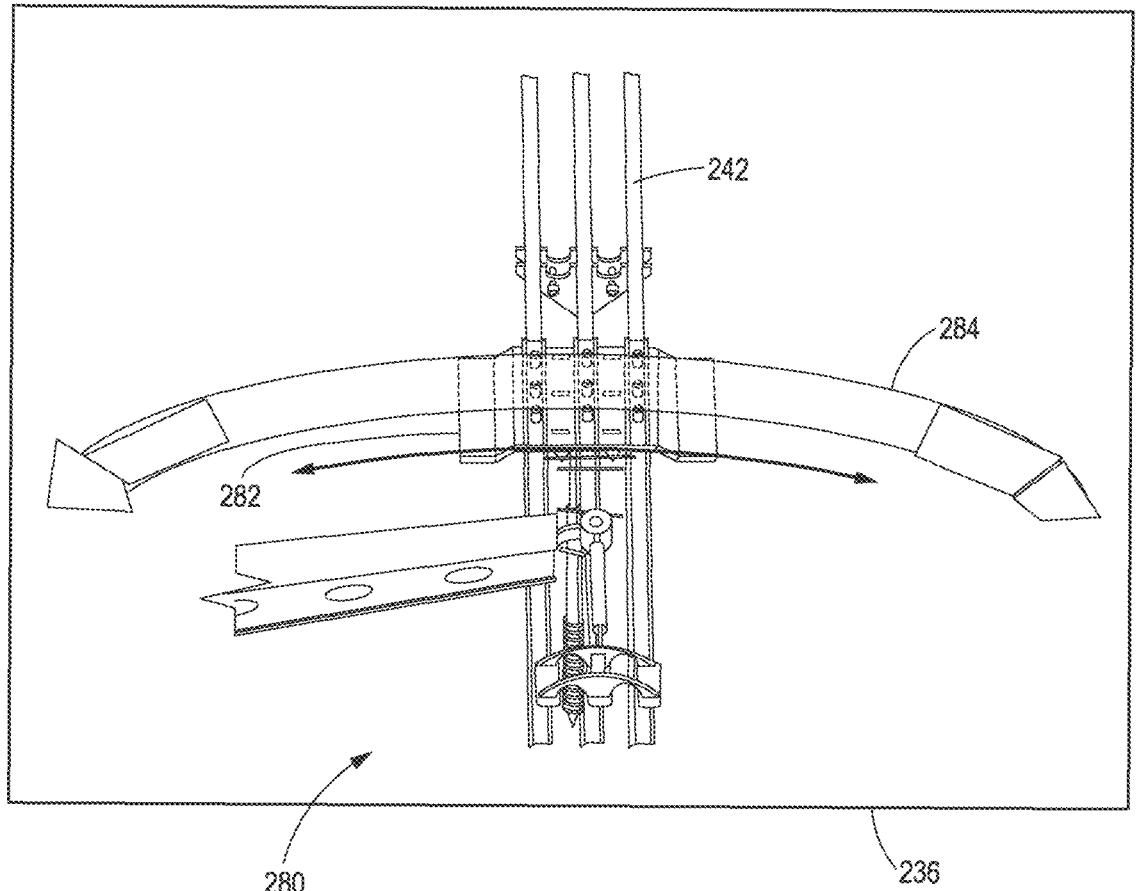
FIG. 10 is an additional graphical display of the alignment assist assembly of FIG. 6, in accordance with an example of the present disclosure.

In another example illustrated at FIG. 10, a graphic representation of the current collector 220 is also provided on the display 236. In this example, the display 236 shows a displayed image 280 that includes the graphic representation 242 of the power rail 108, a graphic representation 282 of the current collector 220, and a modified alignment overlay 284. The alignment overlay 284 in this example is curved to account for the complex angle at which the camera 232 is pointed to obtain images of both the power rail 108 and the current collector 220. The graphic representation 242 of the power rail 108 and the graphic representation 282 of the current collector 220 are used as the "needle" in the displayed image 280, so that the direction of steering to correct course and maintain proper alignment is intuitive.

Those of ordinary skill in the field will appreciate that the principles of this disclosure are not limited to the specific examples discussed or illustrated in the figures. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

The present disclosure provides systems and methods for assisting an operator to steer a work machine in a manner that aligns a current collector with a power rail. A camera obtains images of at least the power rail from a camera positioned a fixed distance from the cab of the work machine and displays a graphic representation corresponding to the power rail on a display. An alignment overlay is provided on the display to indicate alignment and/or a degree of misalignment. The visual feedback allows the operator to alter a direction of travel of the work machine to maintain a spacing of the work machine relative to the power rail, thereby to maintain contact between the current collector and the power rail.

Accordingly, FIG. 11 illustrates a method 300 of aligning a work machine, traveling along a haul route, with at least one power rail so that a current collector of the work machine is in contact with a surface of at least one power rail. The method 300 begins at block 302 by capturing an image field from a camera coupled to a boom distal end of the work machine and oriented toward the haul route, the camera configured to generate an image signal indicative of the image field. At block 304, the method continues by displaying, on a display operably connected to the camera and disposed in a cab of the work machine, a displayed image based on the image signal from the camera. At block 306, the method further includes displaying, on the display, an alignment overlay indicative of a range of distances between a frame of the work machine and the at least one power rail that permit the current collector to engage the surface of the at least one power rail.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially parallel" need not be exactly 180 degrees but may also encompass slight variations of a few degrees based on the context.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An alignment assist assembly for a work machine, the work machine including a frame, a cab coupled to the frame, an electric motor coupled to the frame, traction devices coupled to the frame and operably coupled to the electric motor to cause movement of the work machine disposed proximate a haul route when powered by the electric motor, a boom coupled to and extending laterally from the frame, a trailing arm assembly pivotably coupled to the boom, and a current collector coupled to the trailing arm assembly and configured to move across a surface of at least one power rail along the haul route and conduct electrical energy to the electric motor, the alignment assist assembly comprising:
  a camera configured to be supported to a lateral side of the work machine and at an elevation above the at least one power rail, wherein the camera is configured to be oriented downward toward the haul route and to capture an image field and generate an image signal indicative of the image field;
  a display operably connected to the camera and configured to be disposed in the cab, the display configured to generate a displayed image based on the image signal from the camera; and
  the display further being configured to display an alignment overlay indicative of a range of distances between the frame and the at least one power rail that permit the current collector to engage the surface of the at least one power rail.

2. The alignment assist assembly of claim 1, wherein the camera and the display are configured such that, when the current collector is in contact with the surface of the at least one power rail:
  the image field captured by the camera includes an image of the at least one power rail; and
  the displayed image includes a graphic representation of the at least one power rail positioned relative to the alignment overlay,
  wherein, the graphic representation of the at least one power rail extends through the alignment overlay and indicates correct spacing between the frame and the at least one power rail.

3. The alignment assist assembly of claim 2, wherein the display is configured such that the graphic representation of the at least one power rail extends vertically across the display, and the alignment overlay extends horizontally across the display.

4. The alignment assist assembly of claim 3, wherein the alignment overlay includes:
  a first region at a central portion of the alignment overlay, the first region having a first graphic indicia; and
  a second region at portions of the alignment overlay immediately outward of each side of the central portion, the second region having a second graphic indicia different from the first graphic indicia.

5. The alignment assist assembly of claim 4, wherein the alignment overlay includes a third region at portions of the alignment overlay immediately outward of each side of the second region, the third region having a third graphic indicia different from the first graphic indicia and the second graphic indicia.

6. The alignment assist assembly of claim 5, wherein the first graphic indicia comprises a first color, the second graphic indicia comprises a second color, and the third graphic indicia comprises a third color.

7. The alignment assist assembly of claim 1, in which, wherein the camera and the display are configured such that, when the current collector is not in contact with the surface of the at least one power rail:
  the image field captured by the camera includes an image of an entry rail aligned with the at least one power rail; and
  the displayed image includes a graphic representation of the entry rail positioned relative to the alignment overlay;
  wherein the graphic representation of the entry rail extends through the alignment overlay and indicates correct spacing between the frame and the at least one power rail.

8. The alignment assist assembly of claim 1, wherein the camera and the display are configured such that, when the current collector is in contact with the surface of the at least one power rail:
  the image field captured by the camera includes an image of the at least one power rail and an image of the current collector; and
  the displayed image includes a graphic representation of the at least one power rail and a graphic representation of the current collector positioned relative to the alignment overlay;
  wherein the graphic representation of the at least one power rail and the graphic representation of the current collector both extend through the alignment overlay and indicate correct spacing between the frame and the at least one power rail.

9. A work machine, comprising:
  a frame;
  a cab coupled to the frame;
  an electric motor coupled to the frame;
  traction devices coupled to the frame and operably coupled to the electric motor to cause movement of the work machine disposed proximate a haul route when powered by the electric motor;
  a boom coupled to and extending laterally from the frame;
  a trailing arm assembly pivotably coupled to the boom;
  a current collector coupled to the trailing arm assembly and configured to move across a surface of at least one power rail along the haul route and conduct electrical energy to the electric motor; and
  an alignment assist assembly comprising:

a camera coupled to the work machine and supported to a lateral side of the work machine and at an elevation above the at least one power rail, the camera being oriented downward toward the haul route and configured to capture an image field and generate an image signal indicative of the image field;

a display operably connected to the camera and disposed in the cab, the display configured to generate a displayed image based on the image signal from the camera; and the display further being configured to display an alignment overlay indicative of a range of distances between the frame and the at least one power rail that permit the current collector to engage the surface of the at least one power rail.

10. The work machine of claim 9, wherein the camera and the display are configured such that, when the current collector is in contact with the surface of the at least one power rail:

the image field captured by the camera includes an image of the at least one power rail; and the displayed image includes a graphic representation of the at least one power rail positioned relative to the alignment overlay;

wherein the graphic representation of the at least one power rail extends through the alignment overlay and indicates correct spacing between the frame and the at least one power rail.

11. The work machine of claim 10, wherein the graphic representation of the at least one power rail extends vertically across the display, and the alignment overlay extends horizontally across the display.

12. The work machine of claim 11, wherein the alignment overlay includes:

a first region at a central portion of the alignment overlay, the first region having a first graphic indicia; and a second region at portions of the alignment overlay immediately outward of each side of the central portion, the second region having a second graphic indicia different from the first graphic indicia.

13. The work machine of claim 12, wherein the alignment overlay includes a third region at portions of the alignment overlay immediately outward of each side of the second region, the third region having a third graphic indicia different from the first graphic indicia and the second graphic indicia.

14. The work machine of claim 13, wherein the first graphic indicia comprises a first color, the second graphic indicia comprises a second color, and the third graphic indicia comprises a third color.

15. The work machine of claim 9, wherein the camera and the display are configured such that, when the current collector is not in contact with the surface of the at least one power rail:

the image field captured by the camera includes an image of an entry rail aligned with the at least one power rail; and the displayed image includes a graphic representation of the entry rail positioned relative to the alignment overlay;

wherein the graphic representation of the entry rail extends through the alignment overlay and indicates correct spacing between the frame and the at least one power rail.

16. The work machine of claim 9, wherein the camera and the display are configured such that, when the current collector is in contact with the surface of the at least one power rail:

the image field captured by the camera includes an image of the at least one power rail and an image of the current collector; and the displayed image includes a graphic representation of the at least one power rail and a graphic representation of the current collector positioned relative to the alignment overlay;

wherein the graphic representation of the at least one power rail and the graphic representation of the current collector both extend through the alignment overlay and indicate correct spacing between the frame and the at least one power rail.

17. A method of aligning a work machine, traveling along a haul route, with at least one power rail so that a current collector of the work machine is in contact with a surface of the at least one power rail, the method comprising:

supporting a camera to a lateral side of the work machine and at an elevation above the at least one power rail and the haul route;

capturing an image field from the camera, the camera being oriented downward toward the haul route and configured to generate an image signal indicative of the image field;

displaying, on a display operably connected to the camera and disposed in a cab of the work machine, a displayed image based on the image signal from the camera; and displaying, on the display, an alignment overlay indicative of a range of distances between a frame of the work machine and the at least one power rail that permit the current collector to engage the surface of the at least one power rail.

18. The method of claim 17, wherein:

the image field captured by the camera includes an image of the at least one power rail; and the displayed image includes a graphic representation of the at least one power rail positioned relative to the alignment overlay;

wherein the graphic representation of the at least one power rail extends through the alignment overlay and indicates correct spacing between the frame and the at least one power rail.

19. The method of claim 18, wherein the graphic representation of the at least one power rail extends vertically across the display, and the alignment overlay extends horizontally across the display.

20. The method of claim 17, wherein:

the image field captured by the camera includes an image of an entry rail aligned with the at least one power rail; and the displayed image includes a graphic representation of the entry rail positioned relative to the alignment overlay;

wherein the graphic representation of the entry rail extends through the alignment overlay and indicates correct spacing between the frame and the at least one power rail.

* * * * *